2,783,159
STABILIZER FOR PAINTS AND STABILIZED PAINTS

Jolly J. Taylor, Los Angeles, Calif.

No Drawing. Application October 13, 1952,
Serial No. 314,560

7 Claims. (Cl. 106—255)

This invention relates to oil base paints formulated preferably with drying or semi-drying oils, and which paints may, or preferably do, contain oil and acid modified alkyd resins, particularly the drying and semi-drying alkyd resins, but need not necessarily contain the same.

The oil or acid modifiers of the alkyd may be any oil or acid radical usually employed in forming paints and film formers, and may and preferably do include those oils known to paint technologists as drying oils, and the acid radicals embodied in the modified alkyds may and preferably do include the acid radicals of such drying oils. Such alkyds are generally grouped as the drying alkyds including within the phrase drying alkyds of the resin drying type. Such drying oils are well known to the paint art.

Such oils may also be employed in producing the drying alkyds by combining the drying oil with glyceryl phthalate, maleate or sebacate during the esterification reaction, as is well known to those skilled in this art.

Such drying oils include the linseed oils, both virgin and treated, dehydrated castor oil, soya, sesame, hempseed, sunflower, China-wood, and tung oil.

This invention also is directed to the formulation of paints employing non-reactive pigments. Pigments such as zinc oxide and zinc carbonate or lead carbonate or mixed lead and zinc base paints composed of mixtures of ZnO, ZnCO$_3$ and lead carbonate are termed reactive pigments, since paints which contain them in quantities sufficient to act as pigments will chalk when exposed to light.

I have found that I may produce superior paints and film formers in my invention by employing, in contradistinction to the above reactive pigments, the inert or non-reactive pigments which will not react with the oil or reaction products of the oil when exposed to sunlight and air. Such non-reactive pigments include titanium oxide, talc. Other siliceous pigments, such as aluminum silicate and mica may be used. I may use antimony oxide, calcium carbonate, barium sulfate, zinc sulfate or lithopone. All of these pigments are classed as non-reactive pigments and are so classed by the paint trade.

I have observed that when paints formulated with these non-reactive pigments are exposed to sunlight and air in areas of intense sunlight, they as well as the paints formulated with the reactive pigments, soon crack, chalk, and scale and the paint film breaks down.

I have found that minor amounts of dibasic lead phosphite 2PbO.PbHPO$_3$, ½H$_2$O formed as described in Patent No. 2,483,469, when added to a paint formulated with non-reactive pigments will stabilize the paint against scaling. The film produced from such stabilized paint will last much longer and scale less than a paint formulated with an inert filler from which the stabilizer is omitted. Comparing lead carbonate paints, in which the filler is entirely lead carbonate and carried in a linseed oil base containing a drying accelerator and mineral spirits in a conventional formulation, exemplified in the said Patent No. 2,483,469, with paint carrying the non-reactive filler and the stabilizer dibasic lead phosphite formulated according to the invention described herein, the lead carbonate paint will scale much more under exposure to sunlight and air for like periods than the stabilized paint referred to above.

The amount of dibasic lead phosphite required to give this stabilization is but a small percentage of paint pigment or filler, for example, about .5 to 7.5% by weight of the pigment oil, instead of a large percentage as in the case of the aforementioned paint formulated with lead carbonate. The gloss retention of all such paints is unsatisfactory in climates of intense sunlight and high summer temperature.

I have found that the addition of normal lead salicylate, di-meta hydroxy lead benzoate $$Pb(C_6H_4OHCOO)_2$$

obtained, for example, as described in Patent No. 2,410,977, when added to the oils and to alkyd containing paints as described above, formulated with the non-reactive pigments, will produce a paint whose chalking rate is much less than the chalking rate of the same paint to which the normal lead salicylate has not been added.

Such paints containing the non-reactive pigments and the normal lead salicylate will show a much lower chalking rate than is experienced with like paints pigmented with the reactive pigments such as lead carbonate. The paints containing non-reactive pigments and normal lead salicylate will retain their gloss and show substantially no chalking for a much longer time than will the paints containing the reactive pigments, such as lead carbonate, to which the lead salicylate is not added as a stabilizer.

The addition of normal lead salicylate to lead carbonate paints and to other white pigmented paints, such as paints containing BaSO$_4$, ZnS, ZnO, TiO$_2$, and other inert white pigmented paints usually results in a progressive yellowing of the paint when exposed to intense sunlight and heat. In fact, the yellowing is so rapid and pronounced that lead salicylate may not be practically used in such paints.

I have found, however, that if the normal lead salicylate is used together with dibasic lead phosphite that the yellowing of the paint normally obtained in the absence of dibasic lead phosphite is largely inhibited without in any way impairing the efficiency of the normal lead salicylate in retarding the chalking rate of the paints.

I am thus able by incorporating both the dibasic lead phosphite and the normal lead salicylate to obtain for paints formulated with non-reactive pigments a high degree of gloss retention, and preservation against scaling and chalking without any visible yellowing for periods much longer than is possible with paints formulated without the normal lead salicylate and the dibasic lead phosphite, and containing either non-reactive or reactive pigments.

I have found it desirable to use the lead salicylate in amounts ranging from about 100 to 300% of the amount of the dibasic lead phosphite, and to employ the dibasic lead phosphite in proportions stated above.

I may use the pigment formulated with oils, mineral spirits, with or without the alkyds, or with the alkyds and solvent omitting the oil, in a manner conventional for making up paints with these conventional and well known pigments and oils or alkyds. To the paint I add dibasic lead phosphite in amount from .5 to 7.5% by weight of the paint (pigment plus film former, i. e., oil or alkyd or oil and alkyd) and lead salicylate in amounts from 100% to 300% by weight of the dibasic lead phosphite, An example of a successful oil is given by the following formulation:

| | Pounds |
|---|---|
| TiO2 pigment | 43 |
| Talc | 60 |
| Raw linseed oil | 24 |
| Pine oil | 1.4 |
| Mineral spirits | 4.0 |

The above are ground together with

| | Pounds |
|---|---|
| Drying alkyd resin | 20 |
| Mineral spirits | 6 |
| 24% lead naphthenate | .35 |
| 6% cobalt naphthenate | .15 |

The following were separately milled and added to the above mixture:

| | Pounds |
|---|---|
| Dibasic lead phosphite | 1.5 |
| Normal lead salicylate | 3. |
| Raw linseed oil | 3.6 |

It will be observed that the drying oils, the drying alkyds and the pigment and drying accelerators are used in the proportions conventional for paint formulations, and further discussions of the proportions and ranges and proportions of oil and/or alkyd and of the pigment and drying accelerators are unnecessary, as will be understood by those skilled in the art.

This paint and a like paint from which the dibasic lead phosphite and the normal lead salicylate were omitted but otherwise of the same composition and milled in like manner and painted in side-by-side panels and exposed to the sunlight and air for a prolonged period. The paint containing the dibasic lead phosphite and normal lead salicylate showed substantially no cracking or scaling or chalking and had the same high gloss that it had originally while the surface right next to it painted with the paint in which the lead salts were not added cracked, chalked, scaled, and developed a dull surface to such a degree as to constitute a destruction of the paint film. It is significant to note that the surface coated with the paint formulated according to my invention becomes soft and plastic if heated to 140–150° F., thus indicating the high effectiveness of the stabilizer composition of my invention. The films produced from paints to which the stabilizer composition of my invention is not added is hard and brittle and will not soften under like heating.

While I have disclosed the application of my stabilizer to pigmented paints carrying non-reactive pigments, the stabilization of the film to prevent cracking, excessive drying and loss of gloss is also obtained in clear non-pigmented varnishes and other clear coatings employing as film formers the drying oils and/or drying alkyds. In such cases I restrict the amount of the dibasic lead phosphite and therefore the lead salicylate which, as before, is used in amounts varying from 100% to 300% of the dibasic lead phosphite. I so restrict the amount of the dibasic lead phosphite and the lead salicylate in order that the film be clear, since the above materials impart opacity to the film if used in too large amounts. The amounts should therefore for this purpose be made as high as possible within the ranges given above for the pigmented paints, but not so large as to give the undesired opacity.

While I have described a particular embodiment of my invention for the purpose of illustration, it should be understood that various modifications and adaptations thereof may be made within the spirit of the invention as set forth in the appended claims.

The expression "consisting essentially of" as used in the claims does not exclude from the subject and scope of the claims the inclusion of additional ingredients, other than those specifically recited in such claims, which do not alter the character and function of the recited ingredients as claimed.

I claim:

1. In a coating composition, the combination with a film former taken from the group consisting of the drying oils, semi-drying oils, drying alkyds, and semi-drying alkyds, of a non-reactive pigment, and of a minor effective amount of dibasic lead phosphite and lead salicylate as a stabilizer therefor, said salicylate being present in amount of approximately from 100% to 300% by weight of said phosphite.

2. In a coating composition, the combination as defined in claim 1, wherein said phosphite is present in an amount of approximately from 0.5% to 7.5% by weight of the composition.

3. In a coating composition, the combination with a drying oil and drying alkyd film former, of a non-reactive pigment, and of a minor effective amount of dibasic lead phosphite and lead salicylate as a stabilizer therefor, said salicylate being present in amount of approximately from 100% to 300% by weight of said phosphite.

4. In a coating composition, the combination as defined in claim 3, wherein sadi phosphite is present in an amount of approximately from 0.5% to 7.5% by weight of the composition.

5. In a composition of matter, the combination with a film former taken from the group consisting of the drying oils, semi-drying oils, drying alkyds, and semi-drying alkyds, of a minor effective amount of dibasic lead phosphite and lead salicylate as a stabilizer therefor, said salicylate being present in amount of approximately from 100% to 300% by weight of said phosphite.

6. In a composition of matter, the combination with a drying oil and drying alkyd film former, of a minor effective amount of dibasic lead phosphite and lead salicylate as a stabilizer therefor, said salicylate being present in amount of approximately from 100% to 300% by weight of said phosphite.

7. A composition of matter for stabilizing protective film formers, consisting essentially of dibasic lead phosphite and lead salicylate, the lead salicylate being in the amount of from about 100% to about 300% by weight of the dibasic lead phosphite.

References Cited in the file of this patent

UNITED STATES PATENTS

| | | |
|---|---|---|
| 1,927,768 | Bruson | Sept. 26, 1933 |
| 2,075,251 | Winkelmann | Mar. 30, 1937 |
| 2,406,609 | Kebrich et al. | Aug. 27, 1946 |
| 2,421,706 | Kebrich | June 3, 1947 |
| 2,483,469 | Kebrich | Oct. 4, 1949 |
| 2,574,971 | Heltzer | Nov. 13, 1951 |

OTHER REFERENCES

India Rubber World, vol. 122 of May 1950, page 154–260–45.75.

"Dutch Boy" Dyphos, a publication of National Lead Co.

"Dutch Boy" Normasol, a publication of National Lead Co.